(12) United States Patent
Kamen et al.

(10) Patent No.: US 6,223,104 B1
(45) Date of Patent: *Apr. 24, 2001

(54) FAULT TOLERANT ARCHITECTURE FOR A PERSONAL VEHICLE

(75) Inventors: Dean L. Kamen, Bedford; Susan D. Dastous, Windham; Robert Duggan, Stafford; G. Michael Guay, Derry, all of NH (US)

(73) Assignee: DEKA Products Limited Partnership, Manchester, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/406,086

(22) Filed: Sep. 27, 1999

Related U.S. Application Data

(60) Provisional application No. 60/105,069, filed on Oct. 21, 1998.

(51) Int. Cl.[7] .............................. G05D 1/00; B62D 57/00
(52) U.S. Cl. ................................. 701/1; 701/22; 701/33; 701/34; 701/36; 701/39; 180/7.1; 180/907; 280/5.2
(58) Field of Search ................................. 701/1, 33, 34, 701/36, 39, 43, 124, 22; 180/6.5, 7.1, 21, 65.8, 907; 280/5.2

(56) References Cited

U.S. PATENT DOCUMENTS

| | | | |
|---|---|---|---|
| 4,550,267 | 10/1985 | Vaidya | 310/184 |
| 4,948,998 | 8/1990 | Fink et al. | 310/127 |
| 5,044,065 | 9/1991 | Dyke et al. | 29/597 |
| 5,248,007 | * 9/1993 | Watkins et al. | 180/9.32 |
| 5,253,724 | 10/1993 | Prior | 180/65 |
| 5,274,554 | 12/1993 | Takats et al. | 364/424.03 |
| 5,357,181 | 10/1994 | Mutoh et al. | 318/139 |
| 5,481,460 | 1/1996 | Masaki et al. | 364/424.07 |
| 5,513,716 | 5/1996 | Kumar et al. | 180/8.3 |
| 5,532,476 | 7/1996 | Mikan | 250/221 |
| 5,670,856 | 9/1997 | Le et al. | 318/564 |
| 5,701,965 | 12/1997 | Kamen et al. | 180/7.1 |
| 5,726,541 | * 3/1998 | Glenn et al. | 318/16 |
| 5,791,425 | 8/1998 | Kamen et al. | 180/7.1 |
| 5,819,188 | 10/1998 | Vos | 701/4 |
| 5,929,549 | 7/1999 | Trago et al. | 310/198 |

FOREIGN PATENT DOCUMENTS

| | | |
|---|---|---|
| 4209915A | 9/1993 | (DE) . |
| 0577980A | 1/1994 | (EP) . |
| 0 588 628 | 3/1994 | (EP) . |

* cited by examiner

Primary Examiner—William A. Cuchlinski, Jr.
Assistant Examiner—Yonel Beaulieu
(74) Attorney, Agent, or Firm—Bromberg & Sunstein LLP

(57) ABSTRACT

A motorized vehicle capable of fault detection and of operation after a fault has been detected. The vehicle has a plurality of control components coupled to a motorized drive and a comparator for comparing the output of each of the control components with outputs of other control components so that failures may be identified. The vehicle may have multiple processors coupled to a plurality of control channels by means of a bus and a decision arrangement that suppresses the output of any processor for which a failure has been identified.

15 Claims, 3 Drawing Sheets

FAULT TOLERANT ARCHITECTURE FOR A PERSONAL VEHICLE

This application claims priority from U.S. Provisional Application, Ser. No. 60/105,069, filed Oct. 21, 1998, which is incorporated herein by reference.

TECHNICAL FIELD

The present invention pertains to system architecture for a powered vehicle, and more particularly to redundant features of system architecture.

BACKGROUND OF THE INVENTION

Personal vehicles, such as those used by handicapped persons, for one example, may be self-propelled and user-guidable, and, further, may entail stabilization in one or more of the fore-aft or left-right planes, such as when no more than two wheels are in ground contact at a time. More particularly, such a vehicle is depicted in FIG. 1 where it is designated generally by numeral 10. Vehicle 10 for transporting subject 12 or other payload, may include one or more wheels 16 or clusters 14 of wheels 16, with each wheels and/or clusters being motor-driven, in coordination or independently. Such vehicles are among those described in U.S. Pat. No. 5,701,965 and in U.S. Pat. No. 5,971,091 which are each incorporated herein by reference. Vehicles of this sort may be more efficiently and safely operated when they employ system architectural features supplementary to those described in the prior art.

SUMMARY OF THE INVENTION

In accordance with a preferred embodiment of the present invention, there is provided a vehicle for locomotion over land capable of failure detection. The vehicle has a support structure for supporting a load, a ground-contacting module for providing locomotion capability to the support structure, and a motorized drive arrangement form permitting controllable motion of the ground contacting element. Additionally, the vehicle has a plurality of control components, each control component having an output, and a comparator for comparing the output of a first control component with the output of another of the control components for identifying a failure of either the first or the other control components. The control components may include a sensor for sensing at least one of a position and an orientation of the vehicle, a plurality of redundant control channels, each control channel capable of independently controlling the motorized drive arrangement, or a plurality of processors coupled to each of the redundant control channels by means of a system bus. Each processor has an output and each processor is capable of receiving input commands from a user, a signal from the sensor, and the output of each of the other processors.

In accordance with alternate embodiments of the invention, the control components may be chosen from among a plurality of sensors for sensing position or orientation of the vehicle and a plurality of control channels, each control channel capable of independently controlling the motorized drive. The control components may also include a plurality of processors coupled to the control channels by means of a system bus, and the system bus may couple the plurality of processors and at least one of the set of the user input, a battery capacity indicator, a temperature indicator, a seat height controller, and a crash protection controller. The output of any of the control components may be provided at a rate exceeding a mechanical response rate of the motorized drive. Each processor may be capable of receiving input commands from a user, a signal from the sensor, and the output of each of the other processors, and the comparator may compare the outputs of the processors for identifying a failure of any of the processors, it may also include a disconnect circuit for removing a defective processor from the system bus, and it may suppress the output of any processor for which a failure has been identified in such a manner as to allow continued operation of the vehicle using all other processors.

In accordance with yet further embodiments of the invention, there is provided a vehicle having a support structure for supporting a load and a ground-contacting element for providing locomotion capability to the support structure, the ground contacting element movable about an axle with respect to a local axis, and a motorized drive for permitting controllable motion of the ground contacting element about the axle and for permitting motion of the axle such that the local axis is moved with respect to the support structure. A sensor is provided for sensing at least one of a position and an orientation of the vehicle, as are a plurality of control channels, each control channel capable of independently controlling the motorized drive. The vehicle has a plurality of processors coupled to the control channels by means of a system bus, each processor having an output, each processor capable of receiving input commands from a user, a signal from the sensor, and the output of each of the other processors, and a comparator for intercomparing the output of the processors for identifying a failure of any of the processors. The vehicle may have a motorized drive having a plurality of redundant windings.

In accordance with another embodiment of the invention, there is provided a fail-safe joystick. The joystick has a centering mechanism that restores the joystick to a center position when released by a user and a sensor for detecting the joystick in the center position.

BRIEF DESCRIPTION OF THE DRAWINGS

The invention will be more readily understood by reference to the following description, taken with the accompanying drawings, in which.

DETAILED DESCRIPTION OF SPECIFIC EMBODIMENTS

Figure 1:
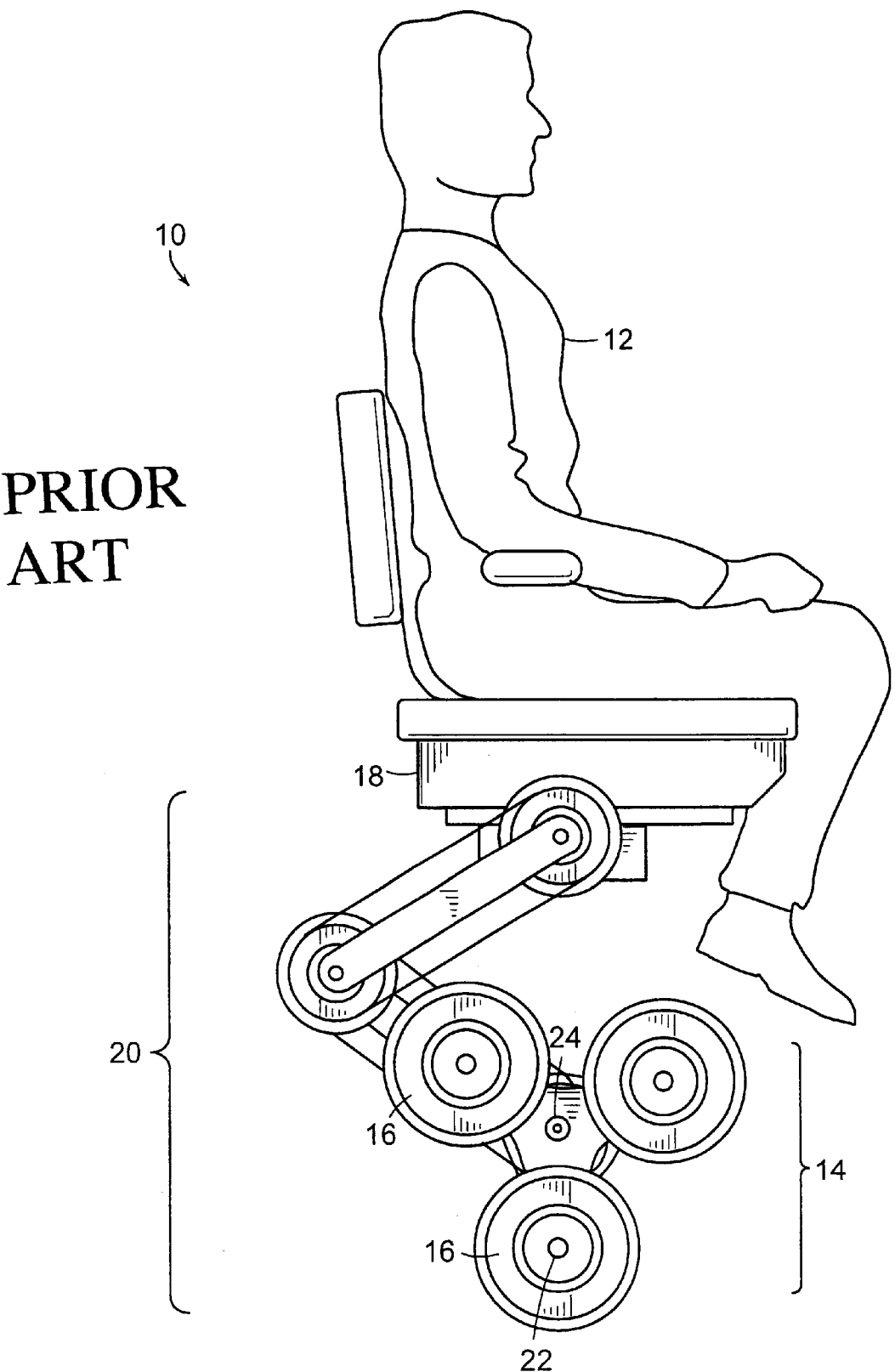
FIG. 1 is a side view of a prior art personal vehicle of a type in which an embodiment of the invention may be advantageously employed.

Referring to FIG. 1, the fundamental parts of vehicle 10 may be considered, without limitation, to include a support 18 for supporting subject 12, a ground-contacting module 20 for transporting support 18, one or more actuator mechanisms (not shown) for driving wheels 16 and/or clusters 14, and one or more controllers for governing the actuator mechanisms in accordance with desired parameters input by a user and the physical position, and configuration of vehicle 10 as well as the measured time rates of change of the position and configuration of the vehicle. The physical position and/or configuration of the vehicle are monitored, on a continuous or periodic basis, by a set of sensors (not shown), the outputs of which are used by the one or more controllers. As an example, sensors providing displacement and tilt information allow the controller to calculate the torque to be applied to the wheels or clusters of a vehicle, in accordance with specified control laws and as described in U.S. Pat. No. 5,701,965 and U.S. Pat. No. 5,971,091.

By way of clarification, the term "ground," as used in the expression "ground-contacting module 20" or in other references to the surface over which vehicle 10 locomotes, may be any surface, interior or exterior to enclosed buildings, which may be traversed by vehicle 10. The term "personal transporter" is used herein interchangeably with the term "vehicle." Additionally, the term "wheels" may equivalently encompass arcuate elements or other ground-contacting members capable of propelling vehicle 10 across the ground. The "position" of the vehicle is referred to some fiducial point fixed with respect to the ground, whereas "configuration" refers to the disposition of components of the vehicle with respect to one another and includes, without limitation, such attributes as seat height, frame lean, etc., as well as settings made in software, such as specified speed, acceleration, joystick sensitivity, etc. In particular, in accordance with a preferred embodiment of the invention, wheels 16 rotate about axles 22 which may themselves be rotated about a cluster axle 24 which constitutes the axis of cluster rotation. Support 18 may, in turn, be raised or lowered with respect to cluster 14. Other internal degrees of freedom which may be present in vehicle 10 are similarly encompassed within the scope of the term "configuration" as used herein and in any appended claims. Similarly, the angular orientation, or tilt, of vehicle 10 with respect to gravity is also encompassed within the scope of the term "configuration."

User input may be provided by the subject transported by the vehicle, as by means of joystick or other interface, or by the user leaning, or by applying hand forces on external objects. Additionally, user input may be provided by an assistant not carried by the vehicle, who may command the motion and/or configuration of the vehicle by applying forces, as to an assist handle, for inducing the vehicle to lean. Alternatively, user input may be provided by an assistant by means of a control module that may be detached from the vehicle, where the control module contains a joystick, switch, or keypad inputs, or in any other way. "Sensor" refers to any device for monitoring any characteristic of the physical position or configuration of the vehicle and may include, for example, an inclinometer for measuring tilt, gyroscopes, encoders for measuring the angular orientation or its rate of change for any of the wheels or clusters, etc.

Safe operation of a vehicle after certain types of failures may require fault tolerance of one or more of the fundamental vehicle parts listed above. As used in this description and in any appended claims, "redundancy" refers to the replication of certain components for contributing to fault tolerance of the vehicle. "Redundancy" also refers to oversampling of data. Thus, for example, data may be provided by sensors at a rate substantially higher than the mechanical response rate of the system. In this case, if a datum is corrupted on the system bus or elsewhere, it will not effect the system response since a new datum will be provided before the response must be provided. In a preferred embodiment of the invention, certain fundamental vehicle parts are electronically interconnected in a system architecture such as the one shown, as an example, in the block diagram of FIG. 2, as now described.

The combination of sensor electronics 34 and control processors 24, 26, and 28, along with their respective power sources 30, may be referred to collectively as a power base 32. Power base 32 contains a multiplicity of power base processors 36, each including sensor electronics 34, a central processing unit (CPU) 24, 26, and 28 and a power source 30. Each CPU 28 has an associated power source 30 and sensor electronics board 34.

Power base 32 is electronically coupled to an interface 38 for receiving user input, as well as to other controllers for controlling peripheral or extraordinary functions of the vehicle. Other controllers and peripheral devices coupled to power base 32 may include, without limitation, a seat height controller 40, as well as a crash protection controller 42 and a crash protection monitor 44, and battery chargers and monitors (not shown). Crash protection controller 42 may provide such functions as the deployment of one or more air bags, as described in pending U.S. provisional application 60/064,175, filed Nov. 4, 1997, or, alternatively, the separation of support 18 (shown in FIG. 1) from ground-contacting module 20 as described in pending U.S. provisional application 60/061,974, filed Oct. 14, 1997. Communication among user interface 38, peripheral controllers 40 and 42, and each of power base processors 24, 26, and 28 of power base 32 is via system serial bus 45, which, in a preferred embodiment, is an asynchronous channel having a capacity of 250 kBaud and employing a time division multiple access (TDMA) protocol.

Actuators for rotating wheels 16 and cluster 14 (shown in FIG. 1) are typically motors, such as left-wheel motor 51, and, in a preferred embodiment, the actuators are servo motors. The actuator 51 for the left wheel may be driven by either of redundant left wheel amplifiers 46 and 48, and, similarly, either right wheel amplifier 50 will drive the actuator for the right wheel, and either cluster amplifier 52 will drive the actuator for the cluster. In a preferred embodiment of the invention, load-sharing power channels are provided whereby both left wheel amplifiers 46 and 48 are required for full performance of left wheel motor 51, however, each left wheel amplifier is capable of providing limited performance for a short period of time, in order to allow the vehicle to come to rest in safety. Power channels may also be referred to herein, and in any appended claims, as "control channels." Additional redundancy may be provided in each motor 51, with half the windings of each motor providing sufficient torque for operation of the vehicle. Each redundant full set of amplifiers 46, 50, and 52, is controlled by one of power amplifier controllers 54 and 56. In particular, it is advantageous to provide all current to the servo motors via wheel amplifiers 46 and 48 so that no high-current series elements are required between the battery and the motor. Communication among redundant power base processors 24, 26, and 28 and power amplifier controller 54 is via power base serial bus 58 while, so as to provide full redundancy, communication among redundant power processors 24, 26, and 28 and power amplifier controller 56 is via a second power base serial bus 60.

Figure 2:
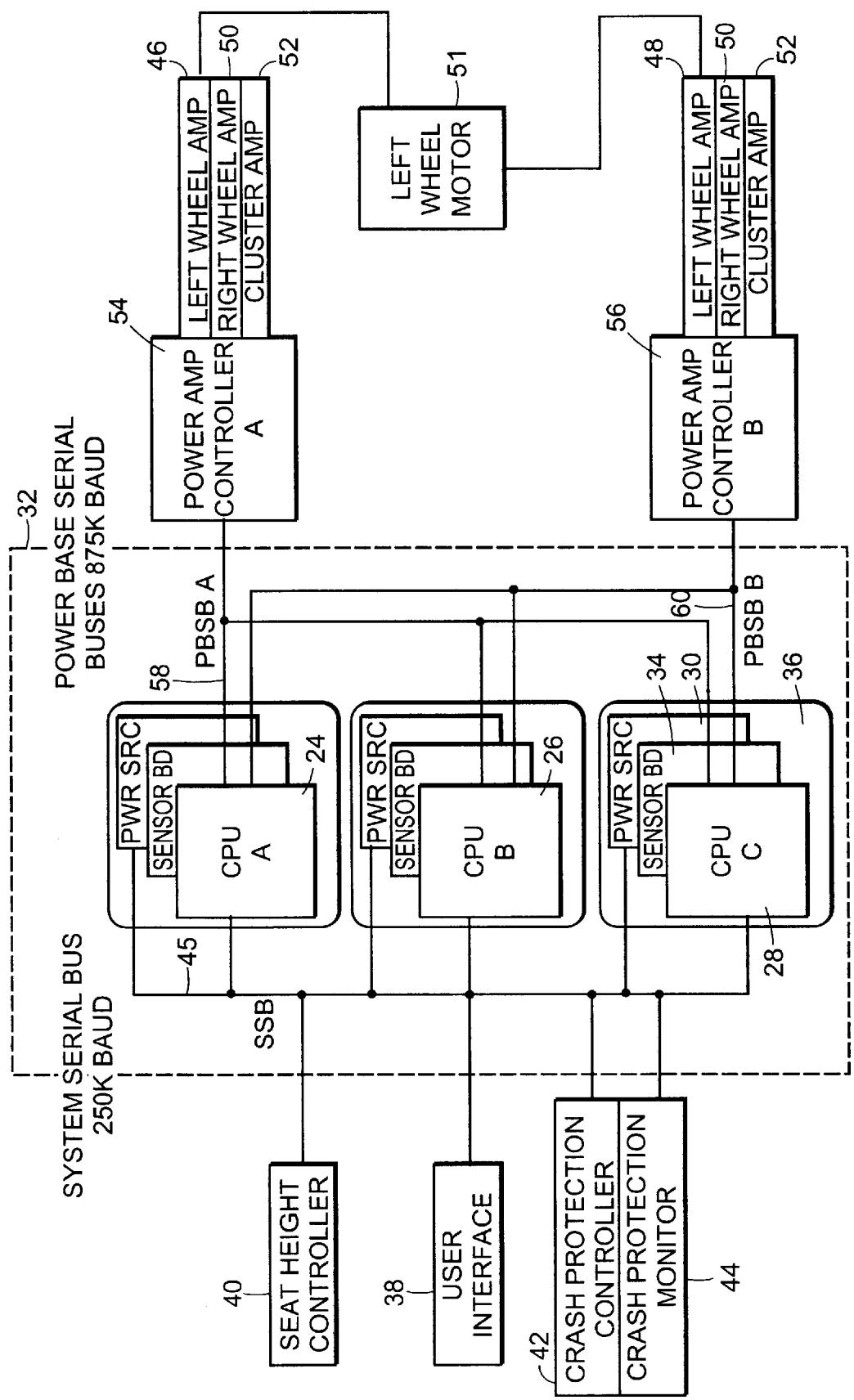
FIG. 2 is a block diagram of the control architecture for controlling a personal vehicle in accordance with a preferred embodiment of the present invention.

As can be appreciated in light of the above system description in reference to FIG. 2, the control architecture associated with the vehicle may be highly redundant, with differing degrees of redundancy attaching to the various components of the system.

Several issues must be addressed in view of the redundancy described above. One issue is the assignment of control and decision making when redundant components are concurrently present and active.

Control of Serial Bus

In accordance with the preferred TDMA protocol discussed above, each device on serial bus 45 has an allocated time slot to transfer or broadcast a predefined data set All devices on serial bus 45 are programmed to respond or listen to specific senders of data based on software configurable control registers. Serial bus 45 is controlled by a processor referred to as the Serial Bus Master, for example, a specified one of power base processors 24, 26, and 28 which may correspond, additionally, to a designated "Master Power Base Processor," designated herein, for purposes of example, as processor 24. The Serial Bus Master controls a master sync packet and bus error data collection. In the event of a Master Power Base Processor interface fault, a "Secondary Power Base Master," determined as described below, assumes the System Serial Bus Mastership.

Fail-Operate Critical Components

In cases where the operation of a component is essential in order to bring the vehicle into a safe mode without endangering the occupant of the vehicle, fault-tolerant triple redundancy is employed, in accordance with a preferred embodiment of the invention, in order to create a fail-operative functionality. One example of a fail-operative critical component is the power base processor, of which three are provided and designated as power base processors 24, 26, and 28 in FIG. 2. Each of power base processors 24, 26, and 28 is also associated with a specified set of critical sensors from which reliable output is required in order to assure critical functionality of the vehicle, including, without limitation, balance of the vehicle, battery condition, etc. It follows that a single-point failure of any processor or sensor should be detectable. Additionally, in accordance with an embodiment of the invention, the detection of a fault in the operation of any processor or detector may be reported to the currently controlling power base processor and from there to user interface 38 and thereby conveyed to the user by means of a visual or non-visual indicator. A non-visual indicator may include an audible warning or one sensible by tactile means, to cite two examples, without limitation. Another means of non-visual indication for warning the user of a potential hazard is the superposition of an intermittent drive signal, either periodic or aperiodic, on the wheel-driving amplifiers, thereby creating uneven motion of the vehicle that may be sensed by the passenger.

In the case of triple redundant sensors or processors, failures may be detected by comparison of the data provided by each sensor to the data provided by the remaining pair of redundant sensors, thereby creating a fail-operative functionality, wherein the vehicle may continue to operate on the basis of the information provided by the remaining sensors, if one is determined to be defective (by the described comparison, or otherwise), until the vehicle may brought to a safe mode without endangering the occupant of the vehicle. In such a case, the remaining sensors or processors may be required to agree to within prescribed limits in order for operation to continue at a reduced level of vehicle functionality, and operation may be immediately terminated in case of disagreement between the remaining sensors or processors. A comparator is provided, using electronic switch circuitry or software running on at least one power base processor, as known to persons skilled in the electronic arts, to disable the connection to serial buses 45, 58, and 60 of any errant processor or sensor. For example, in one mode of operation, the power amplifier controller (PAC) stores the results from power base processor (PBP) A and from PBP B. If the two results are the same, the PAC uses the result from PBP A, since both are correct. If the two results of PBP A and PBP B differ, the PAC will wait a cycle until directed what to do. PBP C will send a signal to the faulted processor to shut itself down in the second cycle, and, in the third cycle, PAC will hear only from the working PBP and will follow its command.

Fail-Safe Critical Components

In the case where failure of a component may be tolerated for the duration of time required to safely terminate vehicle operation, doubly redundant components are employed. In the case of sensors falling into this category, for example, a failure of one of the sensors is detected by comparing the outputs of the respective sensors. In the case in which a discrepancy is detected, operation of the vehicle may be terminated safely, thereby providing a fail-safe functionality. Fail-safe functionality is typically provided for each motor 51, wheel amplifiers 46, 48, and 50, cluster amplifiers 52, and power amplifier controllers 54 and 56, as well as sensors monitoring a force handle (used for external control of the vehicle), brakes, and seat installation in the ground-contacting module.

Failures are detected, in the case of non-redundant sensors, on the basis of characteristics of sensor outputs which are unique to sensor failure modes or by comparison to expected performance. Non-redundant sensors may include, for example, seat height encoders.

Fail-safe Joystick

Figure 3:
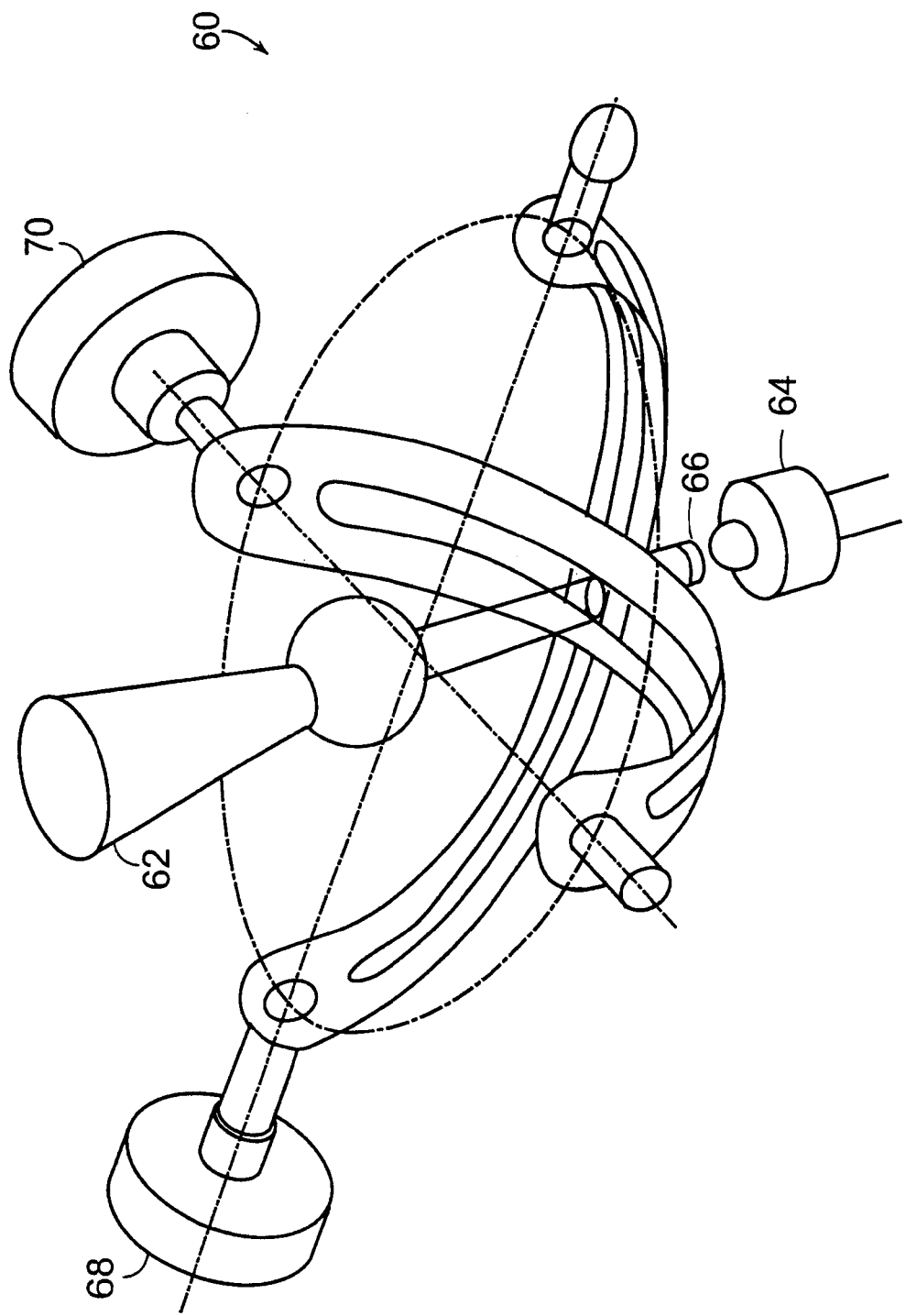
FIG. 3 is perspective view of a fail-safe joystick, in accordance with an embodiment of the present invention.

Referring now to FIG. 3, a fail-safe joystick mechanism is shown and designated generally by numeral 60, having a self-centering joystick 62. Whereas a standard potentiometer joystick may suffer faults causing the device attached to the joystick to see a drift or "hard-over" condition, joystick mechanism 60 provides an independent means of detecting when joystick 62 is in a center position. A sensor 64, which may, for example, be a Hall-effect sensor, senses when joystick post 66 is in the center position, in alignment with sensor 64. Potentiometers 68 and 70 sense the position of joystick 62 with respect to two orthogonal axes. In case a failure occurs in either of potentiometers 68 and 70, if joystick 60 is released, it will return to the center, since it is a self-centering joystick, and will engage sensor 64, thereby providing a signal to the system, independent of the failed potentiometer system.

Contingent Operational Limits

In addition to the detection of component failures as discussed above, additional controller features may be provided, in accordance with alternate embodiments of the present invention, to provide for the safety of the occupant of the vehicle. In the various modes of vehicle control such as those described in U.S. Pat. No. 5,701,965 and U.S. Pat. No. 5,971,091, torque is applied to the appropriate set of clusters or wheels in order to achieve specified control objectives governed by user input or internal control objectives such as vehicle balance. In a case in which a wheel of the vehicle temporarily loses contact with the ground, the rotation of the airborne wheel is not a valid measure of vehicle position with respect to the ground, and the effect of the rotation of the wheel in governing the application of torque to the wheel must be limited, effectively limiting acceleration of the wheel under these circumstances.

Additional bases for speed limiting include a reference to the remaining battery capacity or headroom, such that sufficient reserve torque is always available to maintain vehicle stability. Furthermore, the speed of the vehicle may be limited to prevent overcharging of batteries on descent down an incline if the motors are used for power regeneration.

Similarly, the dissipation requirements of a shunt regulator may be reduced by reducing the maximum speed of the vehicle on descent. Additionally, the vehicle speed may be limited on the basis of seat height in accordance with lateral stability constraints. In addition to speed limiting, modes of operation of the vehicle may be limited on the basis of fault data derived as described above.

The described embodiments of the invention are intended to be merely exemplary and numerous variations and modifications will be apparent to those skilled in the art. All such variations and modifications are intended to be within the scope of the present invention as defined in the appended claims.

We claim:

1. A vehicle for locomotion over land, the vehicle comprising:
   a. a support structure for supporting a load;
   b. a ground-contacting module for providing motion capability to the support structure;
   c. a motorized drive for permitting controllable motion of the ground contacting module;
   d. a plurality of control components coupled to the motorized drive, each control component having an output; and
   e. a comparator for comparing the output of each of the control components with the output of another of the control components for identifying a failure of any of the control components.

2. A vehicle according to claim 1, wherein the plurality of control components are chosen from the group of:
   a. a plurality of sensors for sensing at least one of a position and an orientation of the vehicle;
   b. a plurality of control channels, each control channel capable of independently controlling the motorized drive.

3. A vehicle according to claim 1, wherein the plurality of control components includes:
   a. a plurality of control channels, each control channel capable of independently controlling the motorized drive; and
   b. a plurality of processors coupled to each of the control channels by means of a system bus.

4. A vehicle according to claim 3, further including a disconnect circuit for removing a defective processor from the system bus.

5. A vehicle according to claim 3, wherein the system bus couples the plurality of processors and at least one of the set of a user input, a battery capacity indicator, a temperature indicator, a seat height controller, and a crash protection controller.

6. A vehicle according to claim 1, wherein the output of at least one control component is provided at a rate exceeding a mechanical response rate of the motorized drive.

7. A vehicle for locomotion over land, the vehicle capable of failure detection, the vehicle comprising:
   a. a support structure for supporting a load;
   b. a ground-contacting module for providing locomotion capability to the support structure;
   c. a motorized drive for permitting controllable motion of the ground contacting module;
   d. a sensor for sensing at least one of a position and an orientation of the vehicle;
   e. a plurality of control channels, each control channel capable of independently controlling the motorized drive;
   f. a plurality of processors coupled to the control channels by means of a system bus, each processor having an output, each processor capable of receiving input commands from a user, a signal from the sensor, and the output of each of the other processors; and
   g. a comparator for comparing the outputs of the processors for identifying a failure of any of the processors.

8. A vehicle according to claim 7, wherein the comparator further includes a disconnect circuit for removing a defective processor from the system bus.

9. A vehicle according to claim 7, wherein the comparator suppresses the output of any processor for which a failure has been identified in such a manner as to allow continued operation of the vehicle using all other processors.

10. A vehicle comprising:
    a. a support structure for supporting a load;
    b. a ground-contacting element for providing locomotion capability to the support structure, the ground contacting element movable about an axle with respect to a local axis;
    c. a motorized drive for permitting controllable motion of the ground contacting element about the axle and for permitting motion of the axle such that the local axis is moved with respect to the support structure;
    d. a sensor for sensing at least one of a position and an orientation of the vehicle;
    e. a plurality of control channels, each control channel capable of independently controlling the motorized drive;
    f. a plurality of processors coupled to the control channels by means of a system bus, each processor having an output, each processor capable of receiving input commands from a user, a signal from the sensor, and the output of each of the other processors; and
    g. a comparator for intercomparing the output of the processors for identifying a failure of any of the processors.

11. A vehicle comprising:
    a. a support structure for supporting a load;
    b. a ground-contacting element for providing locomotion capability to the support structure, the ground contacting element movable about an axle with respect to a local axis; and
    c. a motorized drive having a plurality of redundant coils of electrical conductors for permitting controllable motion of the ground contacting element movable about the axle and motion of the axle such that the local axis is moved with respect to the support structure.

12. A vehicle comprising:
    a. at least one ground contacting member for causing motion of the vehicle on the surface of the ground;
    b. a motorized drive permitting controllable motion of the at least one ground contacting element, the controllable motion characterized by a set of motion commands;
    c. a plurality of sensors for monitoring configurational variables and motion variables of the vehicle and generating sensor signals;
    d. a user input for receiving commands from a user for controlling motion of the vehicle;
    e. a plurality of power amplifier controllers, each power amplifier controller capable of controlling the entire set of controllable motion commands;
    f. a plurality of processors, each processor capable of receiving sensor signals from at least a subset of the plurality of sensors and the user input and sending processor commands to each power amplifier controller for controlling the motion of the vehicle in accordance with a system control law; and
    g. a decision arrangement for deciding which of the plurality of processors shall govern in the event that discrepant processor commands are sent to a power amplifier controller.

13. A vehicle according to claim 12, further including a disconnect circuit for removing a defective processor from the system bus.

14. A method for controlling the locomotion of a vehicle, the method comprising:
 a. providing a plurality of control channels, each control channel capable of independently controlling a motorized drive that propels the vehicle;
 b. providing a plurality of processors, each processor supplying an output to each of the control channels by means of a system bus;
 c. comparing the outputs of the processors;
 d. identifying any defective processor; and
 e. controlling the vehicle on the basis of the outputs of the processors other than an identified defective processor.

15. A vehicle according to claim 1, wherein the plurality of control components includes a fail-safe joystick comprising:
 a. a centering mechanism that restores the joystick to a center position when released by a user of the vehicle; and
 b. a sensor for detecting the joystick in the center position.

* * * * *